(12) United States Patent
Kim (10) Patent No.: US 11,770,367 B2
(45) Date of Patent: Sep. 26, 2023

(54) SECURITY METHOD OF XML WEB DOCUMENT

(71) Applicant: 3Ksoft, Seoul (KR)

(72) Inventor: Young Kun Kim, Gyeonggi-do (KR)

(73) Assignee: 3KSOFT, Seoul (KR)

( * ) Notice: Subject to any disclaimer, the term of this patent is extended or adjusted under 35 U.S.C. 154(b) by 54 days.

(21) Appl. No.: 17/241,702

(22) Filed: Apr. 27, 2021

(65) Prior Publication Data

US 2021/0344652 A1    Nov. 4, 2021

(51) Int. Cl.
*H04L 9/40* (2022.01)

(52) U.S. Cl.
CPC ................. *H04L 63/0428* (2013.01)

(58) Field of Classification Search
CPC ................ G06F 21/6209; H04L 63/0428
USPC .......................................................... 726/26
See application file for complete search history.

(56) References Cited

U.S. PATENT DOCUMENTS

| | | | | |
|---|---|---|---|---|
| 6,857,070 B1 * | 2/2005 | Fukuda | ............... | G06F 21/6209 713/153 |
| 6,931,532 B1 * | 8/2005 | Davis | ................. | G06F 21/6209 705/76 |
| 7,103,773 B2 * | 9/2006 | Erickson | ............. | G06F 21/6209 713/160 |
| 8,726,395 B2 * | 5/2014 | Gomez | ............... | G06F 16/9577 726/26 |
| 9,754,120 B2 * | 9/2017 | Bellert | .................. | G06F 21/602 |
| 10,275,603 B2 * | 4/2019 | Auradkar | ............ | G06F 21/6209 |
| 2005/0134896 A1 * | 6/2005 | Koga | .................... | H04L 9/3226 358/1.14 |
| 2008/0037789 A1 | 2/2008 | Motohashi | | |

FOREIGN PATENT DOCUMENTS

| | | |
|---|---|---|
| KR | 101122629 B1 | 3/2012 |
| KR | 101166763 B1 | 7/2012 |
| KR | 101317972 B1 | 10/2013 |
| KR | 101499050 B1 | 3/2015 |
| WO | 2006001268 A1 | 1/2006 |

* cited by examiner

*Primary Examiner* — Amare F Tabor
(74) *Attorney, Agent, or Firm* — Fredrikson & Byron, P.A.

(57) ABSTRACT

According to an embodiment, there is provided a security method of XML web document, and in particular, a method of encrypting a tag set by a user when generating an XML document to display data contents of the encrypted tag as a web document. The security method of XML web document includes setting, by the processor, an encryption tag to be encrypted according to setting of a user; generating, by the processor, an XML document including the encryption tag based on data input by the user; retrieving, by the processor, the set encryption tag of the XML document; and generating, by the processor, an encrypted text for data corresponding to the encryption tag and outputting the encrypted text on a View window, and a plain tag format and the encryption tag format are maintained as they are and displayed on the View window, and only the data corresponding to the encryption tag is displayed on the View window as the generated encrypted text.

20 Claims, 11 Drawing Sheets

SECURITY METHOD OF XML WEB DOCUMENT

CROSS-REFERENCES TO RELATED APPLICATION

This patent application claims the benefit of priority under 35 U.S.C. § 119 from Korean Patent Application No. 10-2020-0052497 filed on Apr. 29, 2020, the contents of which are incorporated herein by reference.

BACKGROUND OF THE INVENTION

1. Field of the Invention

The present invention relates to a security method of XML web document, and in particular, to a method of encrypting a tag set by a user when generating an XML document to display data contents of the encrypted tag as a web document.

2. Description of the Related Art

Internet interconnects many communication networks scattered around the world, and computers connected to the Internet use a communication protocol called Transmission Control Protocol/Internet Protocol (TCP/IP) to communicate with each other.

A web browser is an application program that provides a way to view and interact with information on the Internet. Typically, the web browser uses Hypertext Transfer Protocol (HTTP) to make requests to a web server through the Internet on behalf of a browser user. Known web browsers include, e.g., Microsoft Internet Explorer (IE), Netscape Navigator, Opera browser, Firefox browser, and Lynx browser.

Hypertext Markup Language (HTML) is a scheme used to describe Hyper Media document as one of data formats used on the web browsers. HTML defines a logical structure of hypertext using a standard document format called Standard Generalized Markup Language (SGML), and is stored in a plain text file format. However, although HTML has the advantage of simplicity and ease of use, HTML has the disadvantage of being not able to sufficiently represent the document by having only a limited number of tags. That is, HTML tags only focus on expression methods such as the size and color of characters, and it is difficult to represent structural information of the document. In order to overcome this limitation of HTML, various scripting languages, Dynamic HTML (DHTML), and bypass methods such as channels are used, but as a result of this, a serious problem called the lack of compatibility between browsers has occurred. Furthermore, in the HTML, it is difficult to use data because the data and a code for displaying the data are mixed.

To solve this problem, the W3C established the XML standard. XML is a markup language (information added to documents to support document processing) such as HTML, and is a subset of SGML, and is made to be easy to learn by extracting specific parts of SGML for easy application to web documents and to be easily implemented in applications, while allowing the advantages of SGML to be accommodated to the maximum.

That is, XML is a web page description language that has been standardized by taking advantage of both HTML and SGML. HTML has a limited number of tags, whereas XML allows users to define tags related to the content of a document and allow others to use those tags. This is because XML is essentially a language for describing other languages, that is, a meta language.

Furthermore, since the XML is designed to be able to transmit structured documents on the web, XML guarantees the independence of each element constituting a document, thereby providing characteristics such as document compatibility, content independence, and ease of element change.

By putting data in XML and putting code to display data in XSL, the data and code were separated. The Web browsers were able to convert XML and XSL to HTML using XSLT and display XML and XSL as HTML. Therefore, as the data is put in XML to be separated, it becomes easier to use the data, and thus it is easy to understand by humans and easy to handle by machines, and it is possible to overcome the limitations of HTML expression and at the same time reinforce the shortcomings of SGML.

On the other hand, the XML document that can be viewed directly on the web browser can be generated by using prior Registration Patent No. 10-1122629 (Prior Patent 1) and Registration Patent No. 10-1166763 (Prior Patent 2). However, when View Source option of the XML document generated through Prior Patents 1 and 2 is selected, since data of the XML is exposed on the web browser as it is, a security problem exists. Therefore, there is a need to protect the data content included in the XML document while maintaining the characteristics that the XML document can be viewed on the web browser.

TABLE 1

```
<root>
    <example>Example Tag Data</example>
</root>
```

However, since the conventional XML security technology (e.g., XML Signature, etc.) encrypts the entire data included in the XML document as illustrated in Table 1 above, there is a problem that the encrypted data as illustrated in Table 2 below cannot be viewed in the form of a web document in the web browser.

TABLE 2

Bzig1NLNw5u9n8j9xWxiZ0JrzjRUZgnSME1u1ju9NHKQ00TtrNFKuaAOf9mapvnzar4+UcRgXDriYPk6dHjgtA==

Furthermore, there is a limitation that it is impossible to partially encrypt the data included in the XML document.

Examples of related art include Korean Registered Patent No. 10-1122629, Korean Registered Patent No. 10-1166763, Korean Registered Patent No. 10-1317972, and Korean Registered Patent No. 10-1499050.

SUMMARY OF THE INVENTION

The present invention was devised to solve the problem of security when viewing an XML document on a web browser described above, and it is intended to provide a method of encrypting only data while maintaining a user view screen while keeping an XML tag structure as it is, as illustrated in Table 3 below.

TABLE 3

| Before encryption | `<root>`<br>    `<example>Example Tag Data</example>`<br>`</root>` |
|---|---|
| After encryption | `<root>`<br>    `<example>Xblackbox_qwezvdf15Je=e32_XBlackbox</example>`<br>`</root>` |

The technical problems of the present invention are not limited to those mentioned above, and other technical problems that are not mentioned will be clearly understood by a person skilled in the art from the following description.

According to an embodiment of the present invention, there is provided a security method of XML web document performed by a device including a processor, including setting, by the processor; an encryption tag to be encrypted according to setting of a user; generating, by the processor, an XML document including the encryption tag based on data input by the user; retrieving, by the processor, the set encryption tag of the XML document; and generating, by the processor, an encrypted text for data corresponding to the encryption tag and outputting the encrypted text on a View window, in which a plain tag format and the encryption tag format are maintained as they are and displayed on the View window, and only the data corresponding to the encryption tag is displayed on the View window as the generated encrypted text.

In the generating, by the processor, the XML document of the security method of XML web document, the XML document may be generated while encrypting the data corresponding to the encryption tag.

The security method of XML web document may include setting, by the processor, an encryption tag to be encrypted according to setting of a user; generating, by the processor, an encrypted text for the data corresponding to the encryption tag among data input by the user; and generating, by the processor, an XML document including the encrypted text and outputting the XML document on a View window, and a plain tag format and the encryption tag format are maintained as they are and displayed on the View window, and only the data corresponding to the encryption tag may be displayed on the View window as the generated encrypted text.

In the security method of XML web document, the encryption tag may be all of a plurality of tags, or at least one tag among the plurality of tags.

The generating, by the processor, the encrypted text of the security method of XML web document, may include retrieving, by the processor, a specific format of the data corresponding to the encryption tag; and encrypting, by the processor, only data corresponding to the specific format.

In the security method of XML web document, the specific format may be a preset pattern or a number format.

According to another embodiment of the present invention, there is provided an XML web document security program, the program being stored in a computer-readable recording medium by being combined with a processor, in which the processor performs operations stored in the recording medium, and the recording medium comprises an operation of setting an encryption tag to be encrypted according to setting of a user; an operation of generating an XML document including the encryption tag based on data input by the user; an operation of retrieving the set encryption tag of the XML document; and an operation of generating an encrypted text for data corresponding to the encryption tag and outputting the encrypted text on a View window, and a plain tag format and the encryption tag format are maintained as they are and displayed on the View window, and only the data corresponding to the encryption tag is displayed on the View window as the generated encrypted text.

In the operation of generating the XML document of the XML web document security program, the XML document may be generated while encrypting the data corresponding to the encryption tag.

In the operation of generating the XML document of the XML web document security program, the XML document may be generated while encrypting the data corresponding to the encryption tag.

The XML web document security program may further comprise an operation of setting an encryption tag to be encrypted according to setting of a user; an operation of generating an encrypted text for the data corresponding to the encryption tag among data input by the user; and an operation of generating an XML document including the encrypted text and outputting the XML document on a View window, The operation of generating the encrypted text of the XML web document security program may include an operation of retrieving a specific format of the data corresponding to the encryption tag; and an operation of encrypting only data corresponding to the specific format.

A security method of XML web document according to an embodiment of the present invention can encrypt only data while maintaining the user view screen while keeping the XML tag structure as it is.

In addition, when creating an XML document, a user can set only a specific tag to be encrypted, and only data corresponding to the specific tag is encrypted and displayed on the View screen.

The effects of the present invention are not limited to the effects mentioned above, and other effects that are not mentioned will be clearly understood by a person having ordinary skill in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention can be modified in various ways and may include various embodiments, and thus specific embodiments of the present invention will be described in detail with reference to the drawings. However, this is not intended to limit the present invention to the specific embodiments and should be understood to cover all changes, equivalents, and substitutes included within the spirit and technical scope of the present invention. In describing each drawing, similar reference numerals have been used for similar components.

Terms such as first, second, A, and B may be used to describe various components, but the components are not limited by the terms. The above terms are used only for the purpose of distinguishing one component from other components. For example, without departing from the scope of right of the present invention, a second component may be named as a first component, and similarly, the first component may be named as the second component. The term of and/or includes a combination of a plurality of related listed items or any of the plurality of related listed items.

When a certain component is referred to as being "coupled" or "connected" to another component, it should be understood that the component may be directly coupled or connected to the other component, but other components may exist in the middle. On the other hand, when a certain component is referred to as being "directly coupled" or "directly connected" to another component, it should be understood that there is no other component in the middle.

The terms used in the present application are only used to describe specific embodiments, and are not intended to limit the present invention. A singular expression includes a plural expression, unless it is explicitly meant differently in the context. In the present application, it is to be understood that terms such as "include" or "have" are intended to designate the existence of features, numbers, steps, actions, components, parts, or combinations thereof described in the specification and do not preclude the possibility of the presence or addition of one or more other features or numbers, steps, actions, components, parts, or combinations thereof.

In addition, it is to be understood that the terms "first" and "second" are used herein for discrimination purposes only, and do not mean representing or predicting sequences or priorities in any way.

Unless otherwise defined, all terms used herein including technical or scientific terms have the same meaning as generally understood by a person having ordinary skill in the art to which the present invention pertains. Terms such as those defined in a generally used dictionary, should be interpreted as having a meaning consistent with the meaning in the context of the related technology, and are not to be interpreted as an ideal or excessively formal meaning unless explicitly defined in the present application.

Throughout the specification and claims, when a certain part includes a certain component, it means that other components may be further included, rather than excluding other components, unless specifically stated to the contrary.

Throughout the specification and claims, 'tag' is a term used in XML grammar, which means an element name and may have a form starting with '<' and ending with '>', and includes a start tag and an end tag. An element content or an element value is present between the start tag and the end tag.

Hereinafter, preferred embodiments according to the present invention will be described in detail with reference to the accompanying drawings.

Figure 1:
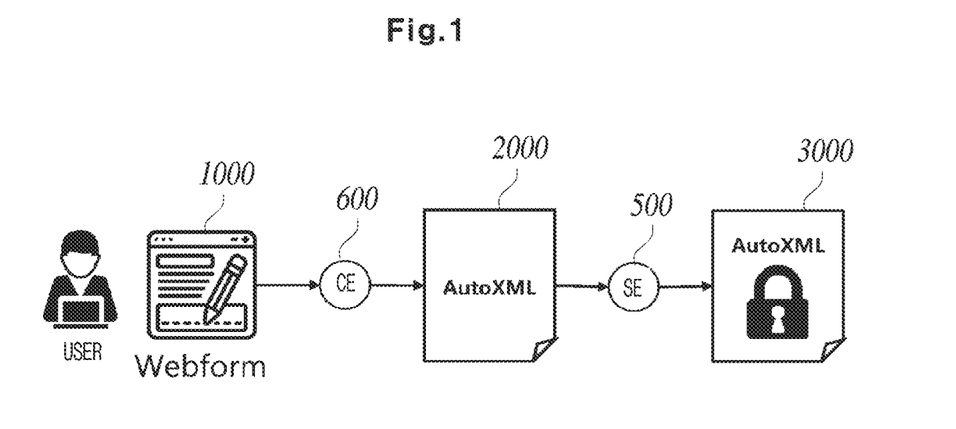
FIG. 1 is a conceptual diagram illustrating a security method of XML web document according to an embodiment of the present invention.

FIG. 1 is a conceptual diagram of a security method of XML web document according to an embodiment of the present invention.

Using the security method of XML web document according to the embodiment of the present invention, a user can generate an XML document 2000 through an XML generation engine 600 with data input on the web browser 1000, and, for the generated XML document, an XML document 3000, in which only data is encrypted while maintaining the user view screen (View) while keeping the XML tag structure as it is, can be generated through the encryption engine 500 according to an embodiment of the present invention.

Meanwhile, throughout the specification and claims, the term 'View window' refers to a form of a web document that a user can check on the web, and may be defined as a web browser conforming to the W3C standard. Web documents may have HTML or XML+XSL file format.

For example, the web documents of the HTML, CSS, and JavaScript types can be displayed on the screen through a browser. In addition, the XML+XSL type web document is transformed into the web documents of the HTML, CSS, and JavaScript types through a browser, and can be displayed on a View window through the browser.

The View window according to an embodiment of the present invention that can be defined as a web browser conforming to the W3C standard may include a Firefox browser, an Internet Explorer browser, a Chrome browser, etc.

Figure 2:
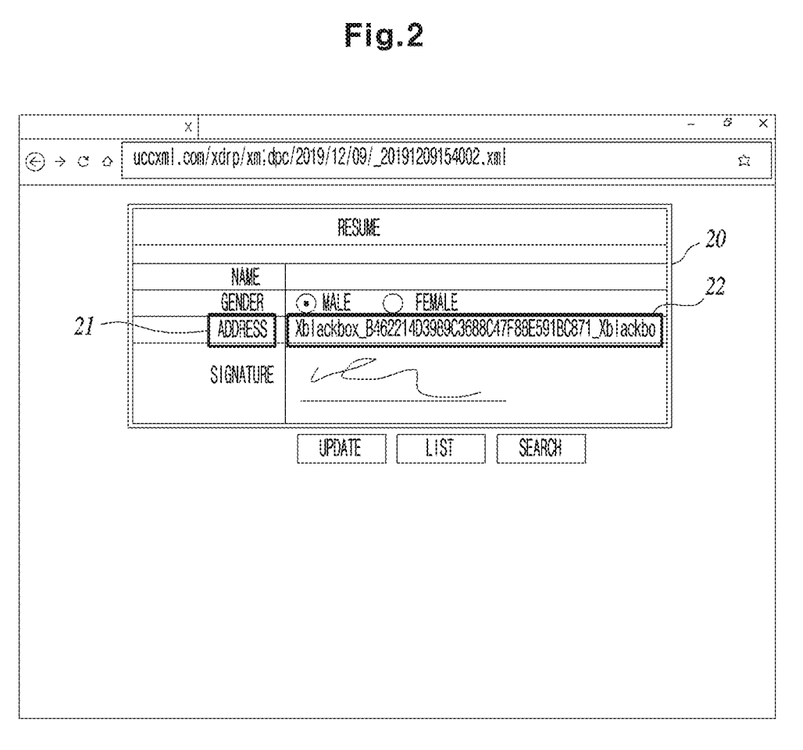
FIG. 2 illustrates a web browser screen in which an XML document is generated by the security method of XML web document according to the embodiment of the present invention.
Figure 3:
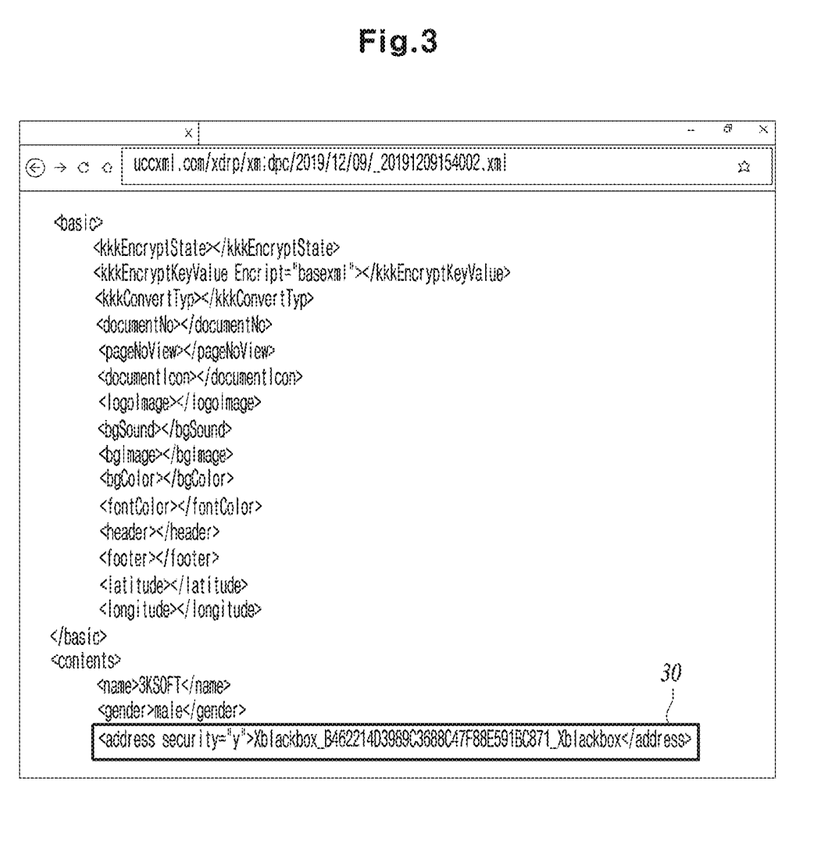
FIG. 3 illustrates an XML source code with which the XML document is generated by the security method of XML web document according to the embodiment of the present invention.

FIG. 2 illustrates a web browser screen in which an XML document is generated by a security method of XML web document according to an embodiment of the present invention. FIG. 3 illustrates an XML source code with which the XML document is generated by the security method of XML web document according to the embodiment of the present invention.

Referring to FIG. 2, only data 22 of an individual tag 21 of an XML document 20 may be encrypted and displayed on the web browser. The security method of XML web document according to the embodiment of the present invention is characterized in that partial encryption of data is possible while allowing a user to directly view the XML document on the web browser.

Referring to FIG. 3, even when View XML Source Code option is selected, a general user can view only the data encrypted in a source 30 corresponding to the encryption tag in the XML source code, and cannot check the contents of the actual data.

Figure 4:
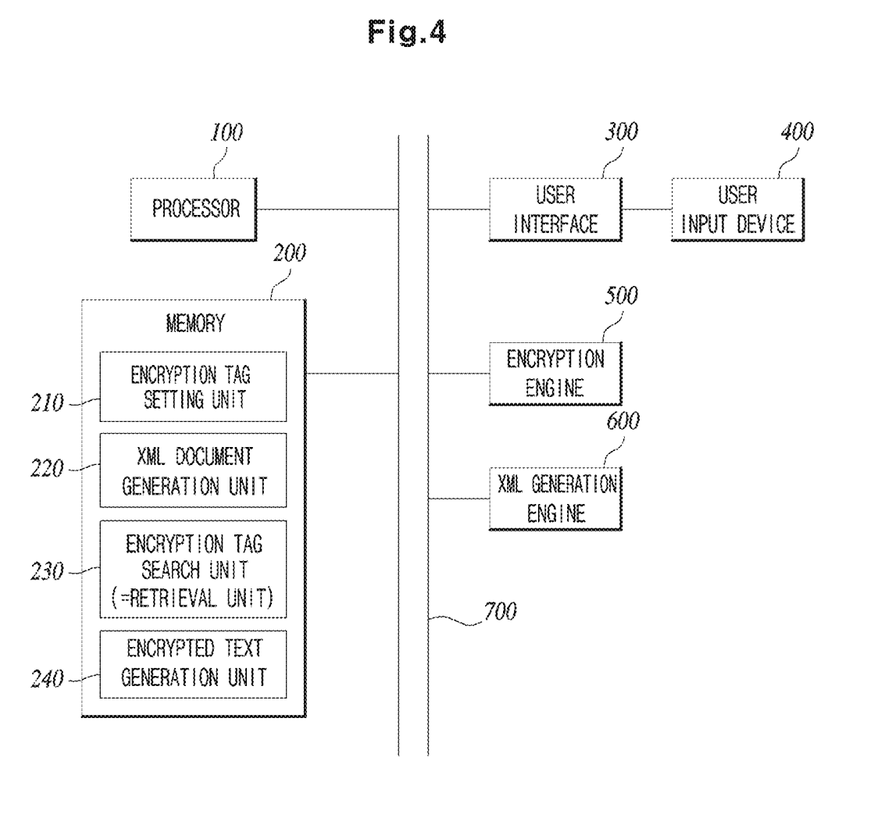
FIG. 4 is a block diagram of an XML web document security system according to an embodiment of the present invention.
Figure 5:
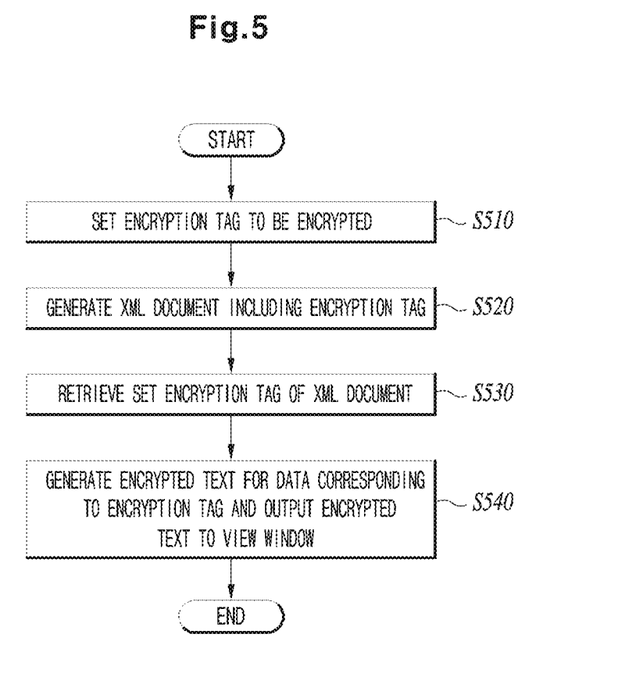
FIG. 5 is a flowchart of the security method of XML web document according to the embodiment of the present invention.

FIG. 4 is a block diagram of an XML web document security system according to an embodiment of the present invention. FIG. 5 is a flowchart of the security method of XML web document according to the embodiment of the present invention.

A system for executing the security method of XML web document according to the present invention may be implemented on a general-purpose microcomputer, and may be stored as a program in a computer-readable memory.

As illustrated in FIG. 4, the system includes a processor 100, a memory 200, a user interface 300, a user input device 400, an encryption engine 500, and an XML generation engine 600, and all of these components can be connected to information transfer communication means 700.

The processor 100 may execute an XML web document security program that performs the method of the present invention described above. Here, the program may be loaded into the memory 200 or may be stored on a storage medium to be loaded into the memory through an appropriate storage medium interface.

Here, the XML web document security program stored in the memory may include an encryption tag setting unit 210, an XML document generation unit 220, an encryption tag retrieval unit 230, and an encrypted text generation unit 240.

The encryption tag setting unit 210 may set the encryption tag to be encrypted according to setting of a user by executing a step S510 of setting the encryption tag of the security method of XML web document according to FIG. 5.

The XML document generation unit 220 according to an embodiment of the present invention may execute a step S520 of generating the XML document of the security method of XML web document according to FIG. 5 using the XML generation engine 600. More specifically, the XML document generation unit 220 may generate an XML document including the encryption tag based on data input by the user.

The encryption tag retrieval unit 230 according to an embodiment of the present invention may execute a step S530 of retrieving the set encryption tag of the XML document.

The encrypted text generation unit 240 according to an embodiment of the present invention may execute a step S540 of generating an encrypted text for data corresponding to the encryption tag using the encryption engine 500.

The encrypted text generated using the encryption engine 500 according to an embodiment of the present invention is output on the View window (S540), the View window is maintained, and only data corresponding to the encryption tag is output on the View window, and thus, the View window can display only partially encrypted data on the entire screen. That is, the plain tag format and the encryption tag format may be maintained as it is and displayed on the View window, and only data corresponding to the encryption tag may be displayed on the View window as the generated encrypted text.

The XML generation engine 600 according to an embodiment of the present invention can generate an eXtensible Markup Language (XML) document by converting large-capacity data of a database into data of the database that can be quickly generated into a dynamic well-formed XML document that is easy to use by using XML substitution technology without using Document Object Model (DOM). More specifically, the XML generation engine 600 according to an embodiment of the present invention may include a source XML document design module, a source XML document separation module, an SQL query statement creation module, an SQL query statement execution module and result data storage module, a data mapping module, and a new XML document generation module.

In the method of generating an XML document using the XML generation engine 600 according to an embodiment of the present invention, a source XML document design step of designing a source XML document provided with a custom tag, a source XML document separation step of separating the source XML document into a general data conversion XML document used when converting general data and a repetition data conversion XML document used when converting the repetitive data among structure data of the source XML document, an SQL query statement creation step of creating an SQL query statement of data to be converted in the database, a result data storage step of storing result data obtained as a result of executing the SQL query statement in a storage sheet after executing the SQL query statement in the database, a data mapping step of mapping the structure data of the source XML document and the result data stored in the storage sheet to each other, and a new XML document generation step of generating a new XML document by replacing the structure data of the source XML document with the result data stored in the storage sheet may be executed.

As described above, according to the security method of XML web document according to an embodiment of the present invention, it is possible to encrypt only data while keeping the XML tag structure as it is, while maintaining the user view screen (view). In addition, the user can set only a specific tag to be encrypted when generating the XML document so that only the data corresponding to the specific tag in the XML document can be encrypted to be displayed on the View screen. Therefore, there is an advantage of being able to partially encrypt and protect data contents included in the XML document.

Figure 6:
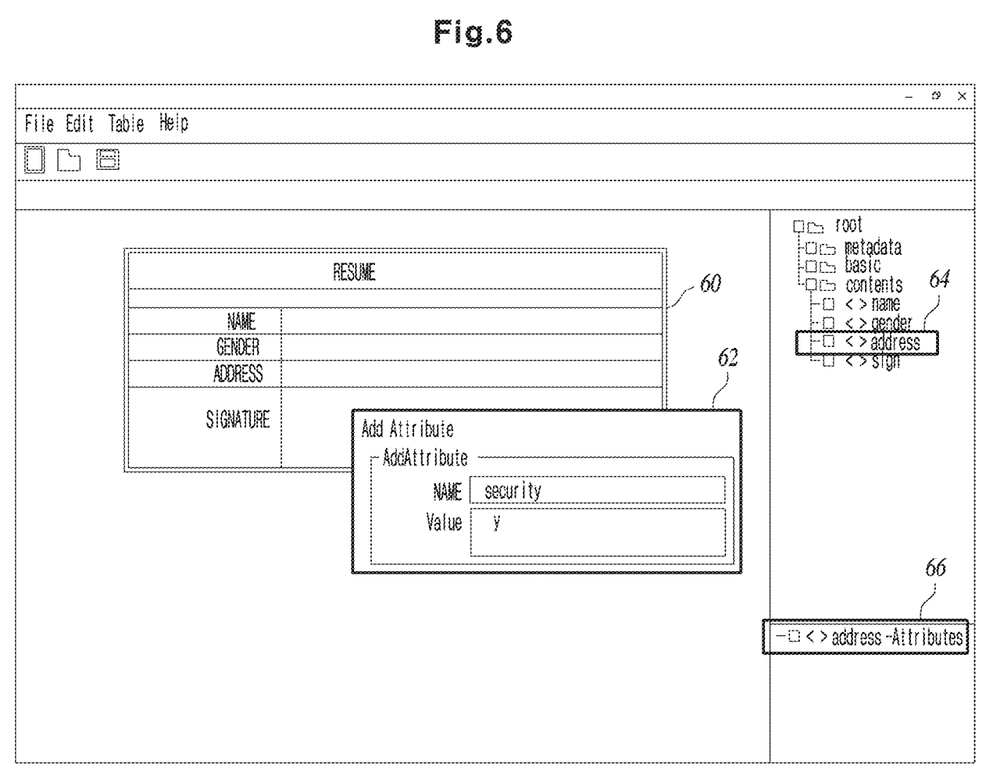
FIG. 6 illustrates a process of setting an option for a tag to be encrypted by a user according to an embodiment of the present invention.

FIG. 6 illustrates a process of setting an option for a tag to be encrypted by a user according to an embodiment of the present invention.

Referring to FIG. 6, a user designs a web form and an XML document 60 using an Xstyler toolkit, etc., and then can set an encryption option 62 for a tag 64 to be encrypted.

In the method of setting the encryption option 62 for the tag 64 to be encrypted by the user, the address tag can be encrypted by clicking Attribute 66 of the tag ('address' in FIG. 6) to set the attribute of the tag as security and designating Value as 'Y'.

Figure 7:
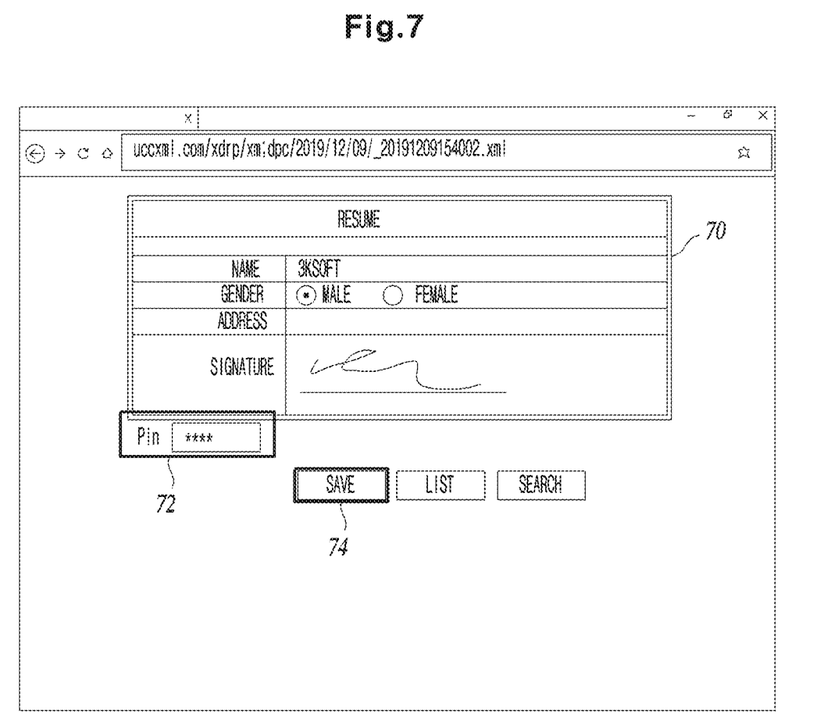
FIG. 7 illustrates a process of inputting and storing data by a user according to an embodiment of the present invention.

FIG. 7 illustrates a process of inputting and storing data by a user according to an embodiment of the present invention.

The user inputs data into each tag (e.g., name, gender, address, signature, etc.) in a web form 70, maps the data to the tag, and uploads the XML document to the server.

If the user also sets a password 72 in the web form 70 and then selects Save 74, an XML document in which the data of the tag is encrypted can be generated.

The encrypted XML document is generated as illustrated in FIG. 2, and data 22 corresponding to the address tag 21, which is a tag for which an encryption option is set, may be encrypted and displayed on the web. In addition, even if the user checks the XML source code as illustrated in FIG. 3, the source code 30 including the address tag, which is the tag for which the encryption option is set, may be encrypted and displayed.

Figure 8:
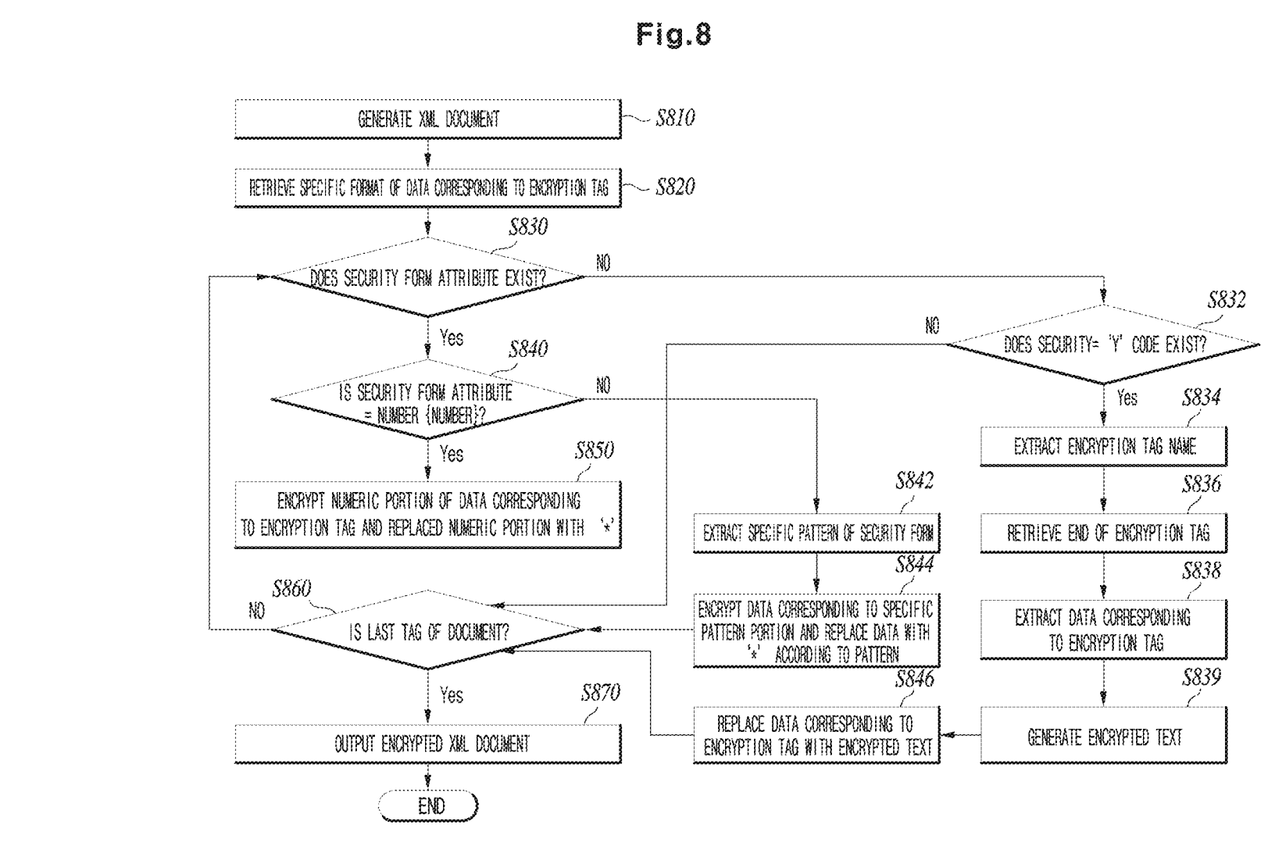
FIG. 8 is a detailed flowchart of the security method of XML web document according to the embodiment of the present invention.

FIG. 8 is a detailed flowchart of the security method of XML web document according to the embodiment of the present invention.

With reference to FIG. 8, the security method of XML web document will be described in detail, and a method of encrypting data according to a specific format (e.g., when data is a number or when data is a preset pattern, etc.) of the data corresponding to a tag will be described. FIG. 8 is based on an embodiment of a sequence of first generating an XML document and then generating an encrypted text for an encryption tag.

After a step S810 of generating the XML document including the encryption tag is executed, steps S820 to S860 of generating the XML document including the encryption tag may be performed.

In the step of generating the XML document including the encryption tag, a step S820 of retrieving a specific format of data corresponding to the encryption tag may be executed first.

Retrieving for the specific format of data corresponding to the encryption tag may include retrieving S830 whether a security form attribute is present in the source code.

When describing the case where there is no Security Form Attribute, only data corresponding to an encryption tag selected from among a plurality of tags may be encrypted as described above with reference to FIGS. 2 to 5.

A method in which data corresponding to the selected encryption tag is encrypted will be described in more detail with reference to Table 4 below. Whether the encryption tag is set may be determined by whether or not Security='y' code exists in the tag (S832). When it is determined that Security='y' code exists in the tag, the name of the encryption tag is extracted (S834), and the processor may retrieve the end of the encryption tag (S836) and extract data included between the start of the encryption tag and the end of the encryption tag (S838).

When the data content corresponding to the encryption tag is extracted, the data content may be generated as an encrypted text according to the present invention (S839). The data corresponding to the encryption tag may be replaced with the generated encrypted text (S846) and output as an XML document (S870).

TABLE 4

| | |
|---|---|
| Before encryption | <name security="y">HongGilDong</name> |
| After encryption | <name security="y">Xblackbox_D456D08643905FE0046A98EEFD96DAF7_Xblackbox</name> |

On the other hand, if Security Form Attribute is present, it is determined, in the present invention, whether the security form attribute is a number (S840).

When it is determined that the determined security type attribute is not a number, a specific pattern of Security Form is extracted (S842), data corresponding to the specific pattern portion is encrypted, and the corresponding data may be replaced with '*' according to the pattern (S844) in the present invention. A specific pattern according to an embodiment of the present invention may be securityForm="N*" as illustrated in Table 5, or securityForm="NNN-**-**" as illustrated in Table 6. However, the specific pattern is not necessarily limited to the patterns illustrated in Tables 5 and 6. The 'N' portion of the specific pattern illustrated in Tables 5 and 6 may be displayed as it is, and only the data of the remaining portion may be encrypted. As described above, when data corresponding to the specific pattern is replaced with an encrypted text, the last tag of the document is checked (S860) and an encrypted XML document may be output (S870)

TABLE 5

| | |
|---|---|
| Before encryption | <name security="y" securityForm="N*">HongGilDong</name> |
| After encryption | <name security="y" securityForm="N*" securityData="Xblackbox_D456D08643905FE0046A98EEFD96DAF7_Xblackbox">H**********</name> |

TABLE 6

| | |
|---|---|
| Before encryption | <telNo security="y" securityForm="NNN-**-**">010-1234-5678</telNo> |

TABLE 6-continued

| After encryption | <telNo security="y" securityForm="NNN-**-" securityData="Xblackbox_8D7875E5EC3D541C661CAD2E5CCFBB45_Xblackbox">010--**<br></telNo> |

When it is determined that Security Form Attribute is a number, as illustrated in Table 7 below, only the numeric portion of the data corresponding to the tag is encrypted and replaced with '*' (S850), and the processor may check the last tag of the document (S860) and output the encrypted XML document.

TABLE 7

| Before encryption | <address security="y" securityForm="number"><br>My current address is 100 Courtland Street Streamwood, IL 60107<br></address> |
| After encryption | <address security="y" securityForm="number">My current address is *** Courtland Street Streamwood, IL *****<br></address><br><address_enc><br>Xblackbox_D7FD069D4CA733BEDF900254FEEF83E4418E57BCB3580FB4223710CFFF554B4DA_Xblackbox<br></address_enc> |

Figure 9:
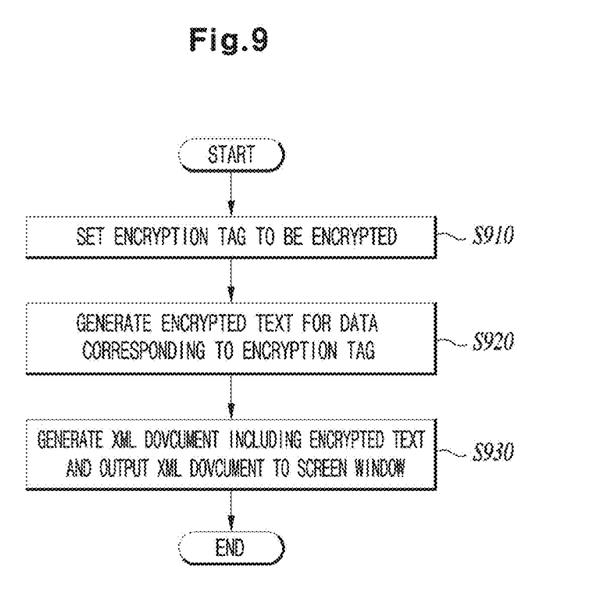
FIG. 9 is a flowchart of a security method of XML web document according to another embodiment of the present invention.
Figure 10:
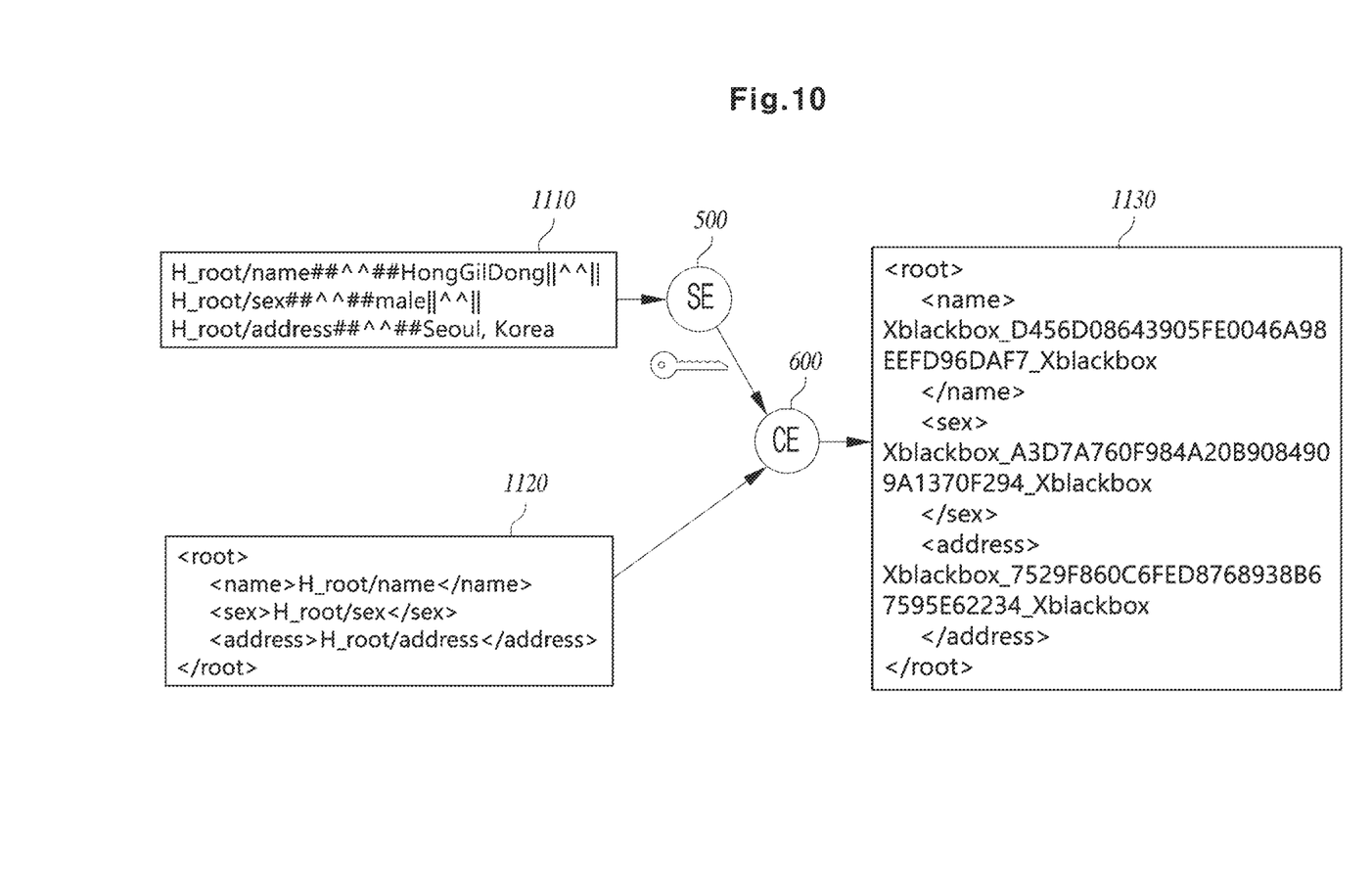
FIG. 10 is a conceptual diagram of the security method of XML web document according to another embodiment of the present invention.

FIG. 9 is a flowchart of a security method of XML web document according to another embodiment of the present invention. FIG. 10 is a conceptual diagram of the security method of XML web document according to another embodiment of the present invention.

The security method of XML web document according to another embodiment of the present invention illustrated in FIGS. 9 and 10 may include a step of setting an encryption tag to be encrypted according to setting of a user (S910); a step of generating an encrypted text for data corresponding to the encryption tag among data input by the user (S920); and a step of generating an XML document including the encrypted text and outputting the XML document on a View window (S930);

That is, the security method of XML web document according to another embodiment of the present invention illustrated in FIGS. 9 and 10 may be characterized in that the sequence of generating an XML document (S520) and the sequence of generating an encrypted text for data corresponding to an encryption tag (S540) of the security method of XML web document illustrated in FIG. 5 are changed.

Therefore, according to the security method of XML web document according to another embodiment of the present invention according to FIG. 9, as illustrated in FIG. 10, data 1110 of a tag corresponding to the tag to be encrypted is encrypted first by the encryption engine 500, and the tag and data 1120 to generate an XML document are encrypted by the XML generation engine 600, so that an XML document 1130 including the encrypted text may be generated.

Figure 11:
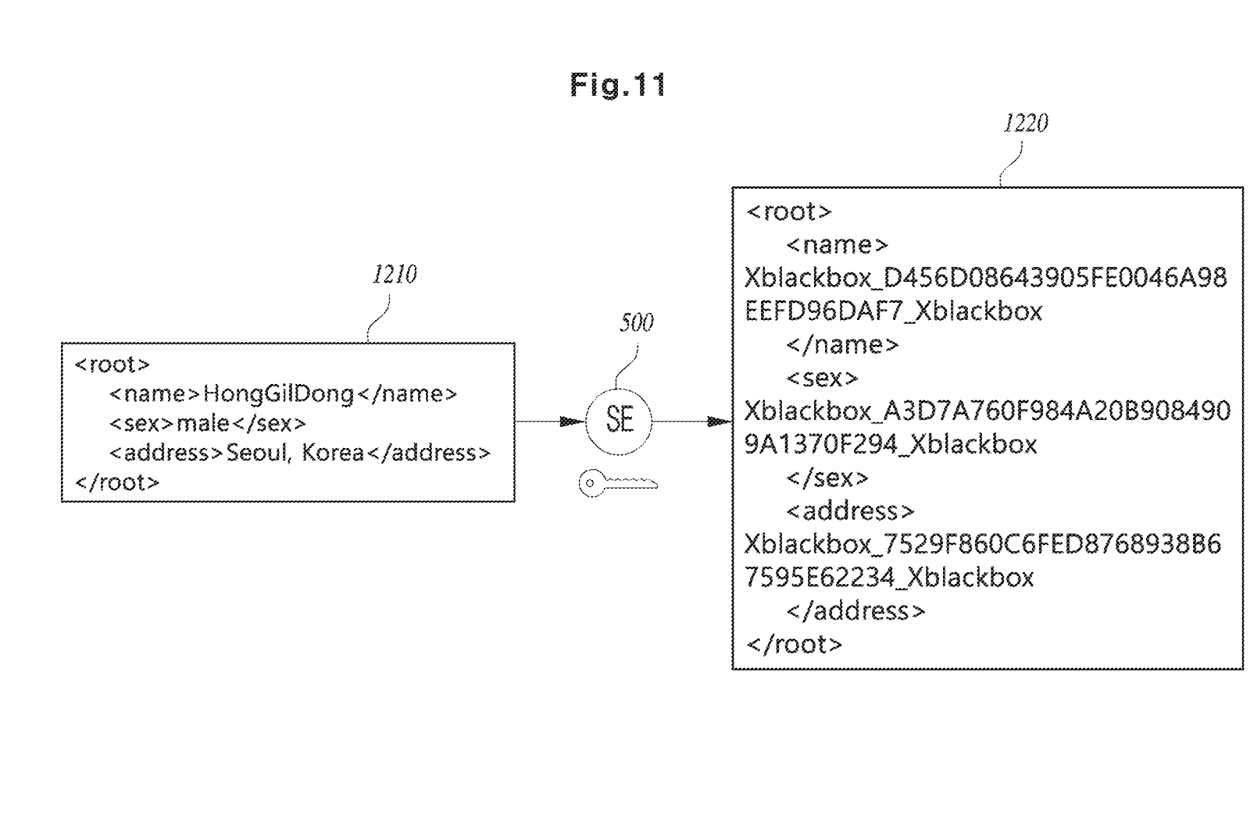
FIG. 11 is a conceptual diagram of a security method of XML web document according to still another embodiment of the present invention.

FIG. 11 is a conceptual diagram of a security method of XML web document according to still another embodiment of the present invention.

Referring to FIG. 11, in the security method of XML web document according to another embodiment of the present invention, an XML document 1220 may be generated by executing encryption on the entire plurality of tags 1210 using the encryption engine 500.

The above description is merely illustrative of the technical idea of the present invention, and those having ordinary skill in the art to which the present invention pertains will be able to make various modifications and variations thereto in a range without deviating from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the claims set forth below, and all technical ideas within the scope equivalent thereto should be construed as being included in the scope of rights of the present invention.

What is claimed is:

1. A security method of XML web document performed by a device including a processor, the method comprising:
setting, by the processor, an encryption tag to be encrypted according to setting of a user;
generating, by the processor, an XML document including the encryption tag based on data input by the user;
retrieving, by the processor, the set encryption tag of the XML document; and
generating, by the processor, an encrypted text for data corresponding to the encryption tag and outputting the encrypted text on a View window in a web browser, wherein
a plain tag format and the encryption tag format are maintained as they are and displayed on the View window, and only the data corresponding to the encryption tag is displayed on the View window as the generated encrypted text.

2. The security method of XML web document according to claim 1, wherein
in the generating, by the processor, the XML document, the XML document is generated while encrypting the data corresponding to the encryption tag.

3. A security method of XML web document performed by a device including a processor, the method comprising:
setting, by the processor, an encryption tag to be encrypted according to setting of a user;
generating, by the processor, an encrypted text for the data corresponding to the encryption tag among data input by the user; and
generating, by the processor, an XML document including the encrypted text and outputting the XML document on a View window in a web browser, wherein a plain tag format and the encryption tag format are maintained as they are and displayed on the View window, and only the data corresponding to the encryption tag is displayed on the View window as the generated encrypted text.

4. The security method of XML web document according to claim 1, wherein
the encryption tag is all of a plurality of tags, or at least one tag among the plurality of tags.

5. The security method of XML web document according to claim 1, herein
the generating, by the processor, the encrypted text includes
retrieving, by the processor, a specific format of the data corresponding to the encryption tag; and
encrypting, by the processor, only data corresponding to the specific format.

6. The security method of XML web document according to claim 5, wherein
the specific format is a preset pattern.

7. The security method of XML web document according to claim 5, wherein
the specific format is a number format.

8. An XML web document security program stored in a computer-readable recording medium by being combined with a processor, wherein
the processor performs operations stored in the recording medium,
the recording medium comprises:
an operation of setting an encryption tag to be encrypted according to setting of a user;
an operation of generating an XML document including the encryption tag based on data input by the user;
an operation of retrieving the set encryption tag of the XML document; and
an operation of generating an encrypted text for data corresponding to the encryption tag and outputting the encrypted text on a View window in a web browser, and
a plain tag format and the encryption tag format are maintained as they are and displayed on the View window, and only the data corresponding to the encryption tag is displayed on the View window as the generated encrypted text.

9. The XML web document security program according to claim 8, wherein
in the operation of generating an XML document,
the XML document is generated while encrypting the data corresponding to the encryption tag.

10. An XML web document security program stored in a computer-readable recording medium by being combined with a processor, wherein
the processor performs operations stored in the recording medium,
the recording medium further comprises:
an operation of setting an encryption tag to be encrypted according to setting of a user;
an operation of generating an encrypted text for the data corresponding to the encryption tag among data input by the user; and
an operation of generating an XML document including the encrypted text and outputting the XML document on a View window in a web browser.

11. The XML web document security program according to claim 8, wherein
the encryption tag is all of a plurality of tags, or at least one tag among the plurality of tags.

12. The XML web document security program according to claim 8, wherein
the operation of generating the encrypted text includes
an operation of retrieving a specific format of the data corresponding to the encryption tag; and
an operation of encrypting only data corresponding to the specific format.

13. The XML web document security program according to claim 12, wherein
the specific format is a preset pattern.

14. The XML web document security program according to claim 12, wherein
the specific format is a number format.

15. The security method of XML web document according to claim 3, wherein
the encryption tag is all of a plurality of tags, or at least one tag among the plurality of tags.

16. The security method of XML web document according to claim 3, wherein
the generating, by the processor, the encrypted text includes
retrieving, by the processor, a specific format of the data corresponding to the encryption tag; and
encrypting, by the processor, only data corresponding to the specific format.

17. The security method of XML web document according to claim 16, wherein
the specific format is a preset pattern.

18. The security method of XML web document according to claim 16, wherein
the specific format is a number format.

19. The XML web document security program according to claim 10, wherein
the encryption tag is all of a plurality of tags, or at least one tag among the plurality of tags.

20. The XML web document security program according to claim 10, wherein
the operation of generating the encrypted text includes
an operation of retrieving a specific format of the data corresponding to the encryption tag; and
an operation of encrypting only data corresponding to the specific format.

\* \* \* \* \*